US009873534B2

(12) United States Patent
Coto et al.

(10) Patent No.: US 9,873,534 B2
(45) Date of Patent: Jan. 23, 2018

(54) TOOLING FOR ULTRASONIC TUBE SEALER FOR SEALING AN END PORTION OF A TUBE TO HAVE A ROUNDED CONFIGURATION

(71) Applicant: Branson Ultrasonics Corporation, Danbury, CT (US)

(72) Inventors: Guillermo Coto, Monroe, CT (US); Michael Davis, Beacon Falls, CT (US); Gene Pollastro, Bethel, CT (US)

(73) Assignee: Branson Ultrasonics Corporation, Danbury, CT (US)

( * ) Notice: Subject to any disclaimer, the term of this patent is extended or adjusted under 35 U.S.C. 154(b) by 35 days.

(21) Appl. No.: 14/967,525

(22) Filed: Dec. 14, 2015

(65) Prior Publication Data

US 2016/0176563 A1 Jun. 23, 2016

Related U.S. Application Data

(60) Provisional application No. 62/107,629, filed on Jan. 26, 2015, provisional application No. 62/094,398, filed on Dec. 19, 2014.

(51) Int. Cl.
*B32B 37/00* (2006.01)
*B65B 51/22* (2006.01)
(Continued)

(52) U.S. Cl.
CPC ............ *B65B 51/225* (2013.01); *B29C 65/08* (2013.01); *B29C 65/7441* (2013.01); *B29C 65/7443* (2013.01); *B29C 66/1122* (2013.01); *B29C 66/2442* (2013.01); *B29C 66/4312* (2013.01); *B29C 66/43121* (2013.01); *B29C 66/8167* (2013.01); *B29C 66/81427* (2013.01);
(Continued)

(58) Field of Classification Search
CPC ... B65B 51/225; B29C 65/08; B29C 65/7441; B29C 65/7443; B29C 66/1122; B29C 66/2442; B29C 66/4312; B29C 66/43121; B29C 66/81427; B29C 66/81435; B29C 66/8167
USPC .................................. 156/73.1, 580.1, 580.2
See application file for complete search history.

(56) References Cited

U.S. PATENT DOCUMENTS 2,568,911 A * 9/1951 Cox ..................... B23K 11/002
219/136
2,851,580 A * 9/1958 Taylor ................. B23K 11/002
219/68
(Continued)

FOREIGN PATENT DOCUMENTS

| JP | H0710130 A | 1/1995 |
| JP | H0752904 A | 2/1995 |
| JP | H09278022 A | 10/1997 |

OTHER PUBLICATIONS

Notification of Transmittal of the International Search Report and Written Opinion of the International Searching Authority for PCT/US2015/066078 dated Apr. 15, 2016.

*Primary Examiner* — James Sells
(74) *Attorney, Agent, or Firm* — Harness, Dickey & Pierce, P.L.C.

(57) ABSTRACT

Tooling for an ultrasonic tube sealer includes an ultrasonic horn tip and an anvil. The ultrasonic horn tip and the anvil each have at least one forming tool. The forming tools have a configuration that form an end of a tube when it is sealed by the ultrasonic tube sealer to be rounded.

15 Claims, 10 Drawing Sheets

(51) Int. Cl.
  *B29C 65/08* (2006.01)
  *B29C 65/74* (2006.01)
  *B29C 65/00* (2006.01)
  *B29L 23/20* (2006.01)

(52) U.S. Cl.
  CPC .... *B29C 66/81435* (2013.01); *B29C 66/8432* (2013.01); *B29L 2023/20* (2013.01)

(56) References Cited

U.S. PATENT DOCUMENTS

| | | | |
|---|---|---|---|
| 3,700,529 A | 10/1972 | Monghan | |
| 5,906,694 A * | 5/1999 | Duly | B23K 20/12 156/251 |
| 5,947,364 A * | 9/1999 | Tamura | B23K 20/106 156/580.2 |
| 2014/0238615 A1 * | 8/2014 | Coto | B23K 20/106 156/580.1 |

\* cited by examiner

TOOLING FOR ULTRASONIC TUBE SEALER FOR SEALING AN END PORTION OF A TUBE TO HAVE A ROUNDED CONFIGURATION

CROSS-REFERENCE TO RELATED APPLICATIONS

This application claims the benefit of U.S. Provisional Application Nos. 62/094,398, filed on Dec. 19, 2014 and 62/107,629 filed Jan. 26, 2015. The entire disclosure of each of the above applications is incorporated herein by reference.

FIELD

The present disclosure relates to ultrasonic tube sealers and tooling therefor.

BACKGROUND

This section provides background information related to the present disclosure which is not necessarily prior art.

A model of a typical ultrasonic tube sealer 100 is shown in FIG. 1. Typical components of ultrasonic tube sealer 100 include an ultrasonic transducer 102, a booster 104, and an ultrasonic horn 106. Electrical energy from a power supply 101 at a frequency of 20-60 kHz is converted to mechanical energy by the ultrasonic transducer 102. The mechanical energy converted in the ultrasonic transducer 102 is transmitted to a tube 108 to be sealed through the booster 104 and the ultrasonic horn 106. The booster 104 and the ultrasonic horn 106 perform the functions of transmitting the mechanical energy as well as transforming mechanical vibrations from the ultrasonic transducer 102 by a gain factor.

The mechanical vibration that results on an ultrasonic horn tip 110 is the motion that performs the task of sealing the tube 108. Ultrasonic horn tip 110 illustratively includes one or more forming tools (not shown) on sides of ultrasonic horn tip 110. A portion of the tube 108 to be sealed, typically an end portion 112, is placed between ultrasonic horn tip 110 and an anvil tip 114 of an anvil 116 and supported by anvil tip 114. Anvil tip 114 illustratively includes a forming tool (not shown). The forming tool of ultrasonic horn tip 110 is brought into contact with end portion 112 of tube 108 pinching end portion 112 between the forming tool of ultrasonic horn tip 110 and the forming tool of anvil tip 114. Typically, ultrasonic horn tip 110 is brought to a predetermined distance from anvil tip 114 so that there is a pre-set gap between the forming tools of ultrasonic horn tip 110 and anvil tip 114 in which the end portion 112 of tube 108 to be sealed is situated. Ultrasonic vibrations are applied via the ultrasonic horn tip 110 to end portion 112 of tube 108. The ultrasonic vibrations generate heat to bond the material of the end portion 112 of tube 108 together where end portion 112 is pinched between the forming tools of ultrasonic horn tip 110 and anvil tip 114. The forming tools of ultrasonic horn tip 110 and anvil tip 114 also form the end portion 112 of tube 108, such as by cutting it. The electrical energy provided by power supply 101 is then stopped and the end portion 112 of tube 108 held closed between the forming tools of ultrasonic horn tip 110 and anvil tip 114 for a brief period of time. An examples of such a prior art ultrasonic tube sealer is the Branson Ultraseal® Ultrasonic Tube Welding System available from Branson Ultrasonics Corporation, Danbury, Conn.

Typically, the forming tools of ultrasonic horn tip 110 and the anvil tip 114 form the end portion 112 of the tube 108 to be a square end. That is, a distal edge and two opposed side edges of the end portion 112 are sides of a square (or rectangle). For example, the forming tools of ultrasonic horn tip 110 and anvil tip 114 cut the end portion 112 of tube 108 with a square cut when they pinch the end portion 112 of tube 108 between them. This square end can have sharp edges can present the risk of cuts if not handled with care by those handling the sealed tube 108, such as the operator of the ultrasonic tube sealer and packagers of the sealed tube 108.

SUMMARY

This section provides a general summary of the disclosure, and is not a comprehensive disclosure of its full scope or all of its features.

In accordance with an aspect of the present disclosure, tooling for an ultrasonic tube sealer includes an ultrasonic horn tip and an anvil. The ultrasonic horn tip and the anvil each have at least one forming tool. The forming tools have configurations that form an end of a tube when it is sealed by the ultrasonic tube sealer to be rounded.

In an aspect, forming tools have a semicircular configuration where they engage the end of the tube. In an aspect, the forming tool of one of the ultrasonic horn tip and the anvil has a semicircular pad with an arcuate wall extending orthogonally from and around an outer periphery of the semicircular pad and the forming tool of the other of the ultrasonic horn tip and anvil has a corresponding raised semicircular pad that is received in a space defined by the arcuate wall when corresponding forming tools of the ultrasonic horn tip and the anvil are brought together. In an aspect, the forming tool of the horn tip has the semicircular pad with the arcuate wall extending orthogonally from and around the outer periphery of the semicircular pad and the forming tool of the anvil has the corresponding raised semicircular pad.

In an aspect, the ultrasonic horn tip includes a plurality of the forming tools and the ultrasonic horn tip has a plurality of sides. At least two of the sides of the ultrasonic horn tip each have one of the plurality forming tools of the ultrasonic horn tip. In this aspect, the anvil also includes a plurality of the forming tools. The anvil has opposed end portions with each end portion having a plurality of sides. At least two of the sides of each end section of the anvil each having one of the forming tools of the anvil.

In an aspect, the ultrasonic horn tip and anvil have a longitudinal orientation with each forming tool of the ultrasonic horn tip opening along an axis that is parallel to a longitudinal central axis of the ultrasonic horn tip and each forming tool of the anvil having a corresponding orientation to an orientation of a corresponding forming tool of the ultrasonic horn tip.

In an aspect, the ultrasonic horn tip and the anvil have a lateral orientation with a side of the ultrasonic horn tip having opposed forming tools with each of the opposed forming tools opens outwardly along an axis that is transverse to a longitudinal central axis of the ultrasonic horn tip and a side of the anvil has opposed forming tools with each forming tool of the anvil in an orientation corresponding to an orientation of a corresponding forming tool of the ultrasonic horn tip.

In an aspect, a tooling kit includes the ultrasonic horn tip and the anvil.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 2:
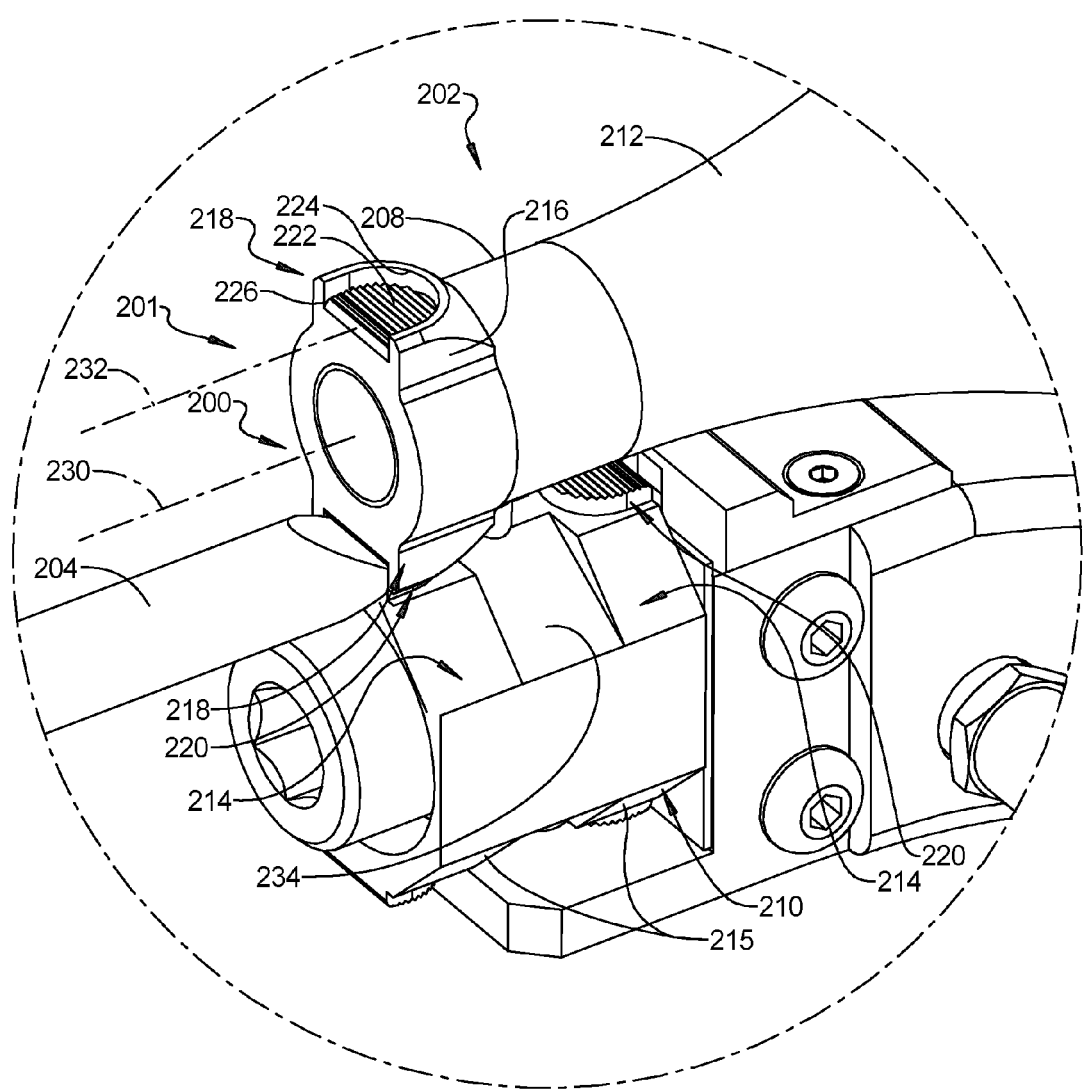
FIG. 2 is a perspective view of a portion of an ultrasonic tube sealer showing an ultrasonic horn tip and anvil tip in accordance with an aspect of the present disclosure.
Figure 3:
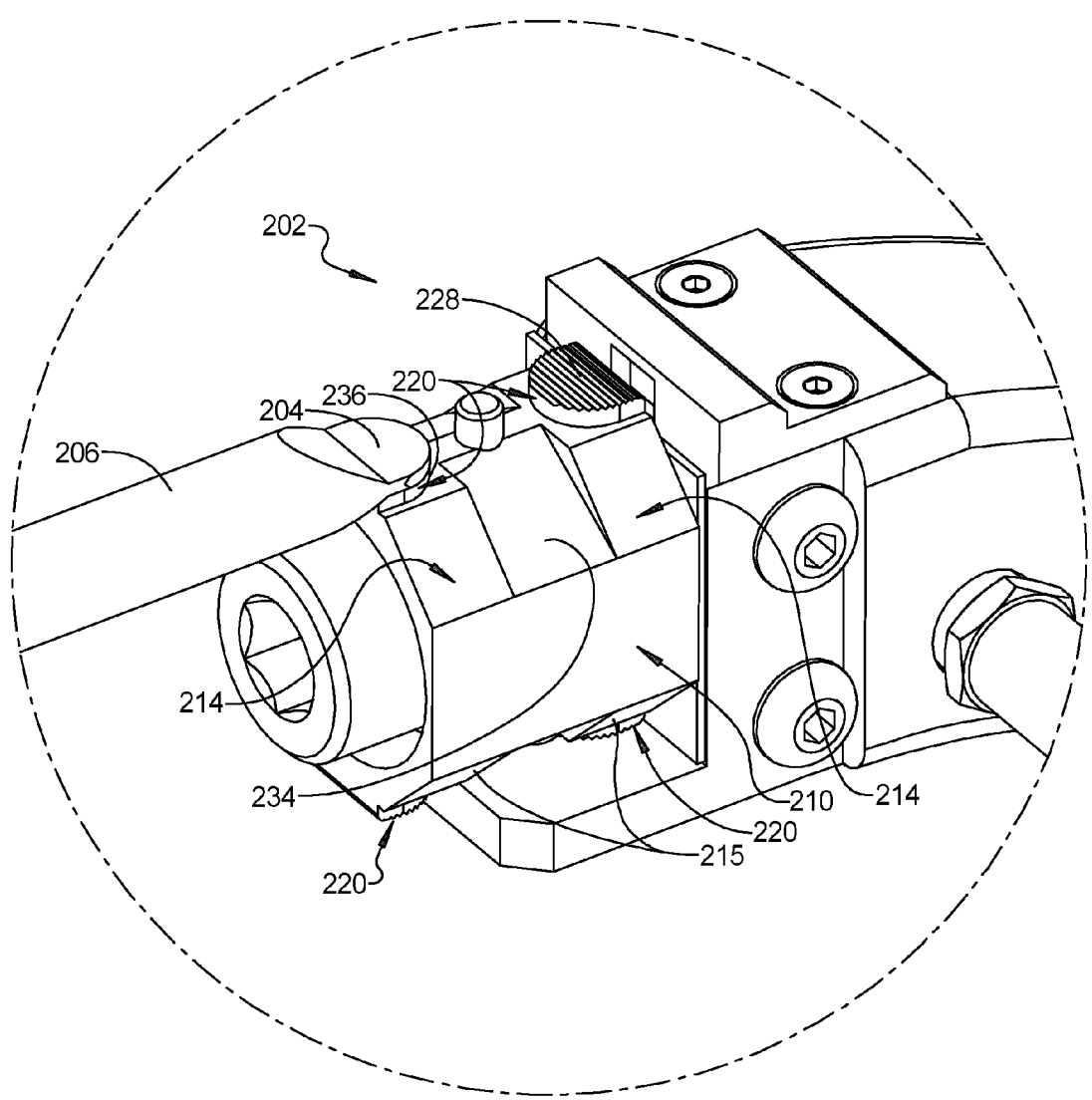
FIG. 3 is a perspective view showing in more detail the anvil tip of FIG. 2 with a tube thereon.
Figure 4:
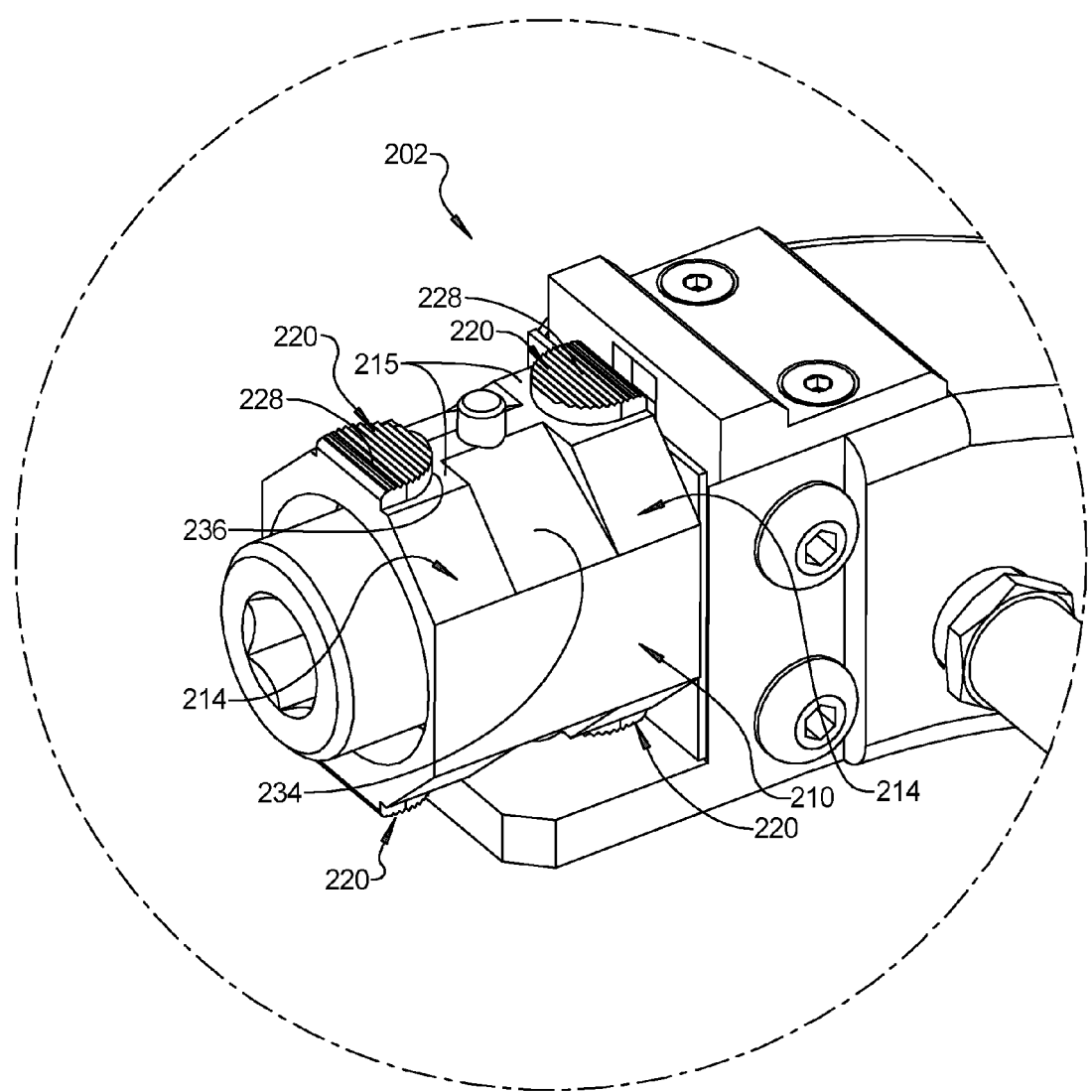
FIG. 4 is a perspective view showing in more detail the anvil tip of FIG. 2 without a tube thereon.

With reference to FIGS. 2-4, in accordance with an aspect of the present disclosure, tooling 200 (FIG. 2) for an ultrasonic tube sealer 202 (only a portion of which is shown in FIG. 2) is configured to form an end portion 204 of a tube 206 being sealed to have a rounded configuration (FIG. 3) when end portion 204 is sealed. It should be understood that with the exception of tooling 200, ultrasonic tube sealer 202 has the same basic components as ultrasonic tube sealer 100 and operates in the same manner.

Tooling 200 includes an ultrasonic horn tip 208 and an anvil 210. In an aspect, tooling 200 includes a tooling kit 201 that includes ultrasonic horn tip and anvil 210. Ultrasonic horn tip 208 is disposed on an ultrasonic horn 212 of ultrasonic tube sealer 202. In the example embodiment, ultrasonic horn tip 208 is a replaceable component and removably mounted on ultrasonic horn 212. In an aspect, ultrasonic horn tip 208 is an integral part of ultrasonic horn 212.

Ultrasonic horn tip 208 illustratively has a plurality of sides 216. At least one of sides 216 has a forming tool 218 thereon configured to form the end portion 204 of tube 206 to be rounded when end portion 204 of tube 206 is sealed. Illustratively, anvil 210 has opposed end portions 214 each with a plurality of sides 215. At least one of sides 215 has a forming tool 220 thereon configured to engage with forming tool 218 of ultrasonic horn tip 208 and cooperates with forming tool 218 to form end portion 204 to be rounded when end portion 204 is sealed.

In the illustrative embodiment shown in FIGS. 2-4, forming tool 218 of ultrasonic horn tip 208 has a semicircular pad 222 and an arcuate wall 224 extending orthogonally from and around outer periphery 226 of semicircular pad 222. Forming tool 220 of anvil 210 has a corresponding raised semicircular pad 228 that is received in the space defined by arcuate wall 224 when end portion 204 of tube 206 is being sealed by ultrasonic tube sealer 202, as best shown in FIG. 2. Anvil has a sloped wall 234 adjacent an outer end 236 of forming tool 220.

Figure 1:
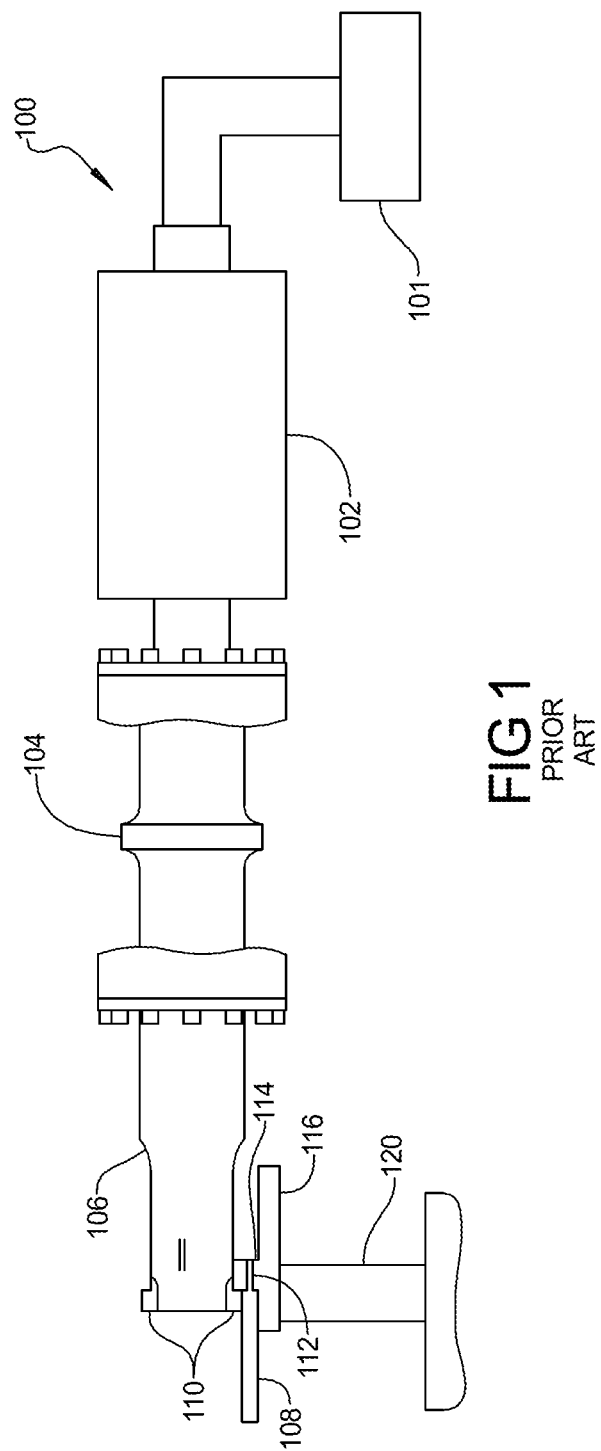
FIG. 1 is schematic view of a prior art ultrasonic tube sealer.

Ultrasonic tube sealer 202 operates in the same manner as ultrasonic tube sealer 100 to seal end portion 204 of tube 206. That is, one of the forming tools of ultrasonic horn tip 208 is brought into contact with one of the forming tools 220 of anvil 210 pinching end portion 204 between them. Ultrasonic vibrations are applied via the ultrasonic horn tip 208 to end portion 204 of tube 206. The ultrasonic vibrations generate heat to bond the material of the end portion 204 of tube 206 together where end portion 204 is pinched between the forming tools 218, 220 of ultrasonic horn tip 208 and anvil 210. The forming tools 218, 220 also form the end portion 204 of tube 206, such as by cutting it, to have a rounded configuration such as a semicircular shape in the example embodiment best shown in FIG. 3. It should be understood that tooling 200 can have a configuration that shapes end portion 204 of tube 206 to have a rounded configuration that is other than semi-circular, for example, semi-elliptical. The electrical energy provided by power supply 101 (FIG. 1) is then stopped and the end portion 204 of tube 206 held closed between forming tools 218, 220 of ultrasonic horn tip 208 and anvil 210 for a brief period of time.

The rounded configuration of end portion 204 of tube 206 after end portion 204 has been sealed has smooth edges and this reduces if not eliminates the concern raised by the sharp edges of tubes having sealed end portions with square ends.

In the example embodiment shown in FIGS. 2-4, two opposed sides 216 of ultrasonic horn tip 208 each have a forming tool 218 thereon. It should be understood that ultrasonic horn tip 208 could be configured to have forming tool 218 on only one of sides 216 or on more than two of sides 216. In the example embodiment shown in FIGS. 2 and 3, anvil 211 has four sides 215 each with a forming tool 220 thereon. It should be understood that anvil 210 could be configured to have fewer than forming tools 220 thereon or more than four.

In the example embodiment shown in FIGS. 2-4, tooling 200 has a longitudinal (or in-line) orientation in that each forming tool 218 of ultrasonic horn tip 208 opens along an axis 232 that is parallel to a longitudinal central axis 230 (FIG. 2) of ultrasonic horn tip 208 and each forming tool 220 of anvil 210 has an orientation corresponding to an orientation of a corresponding forming tool 218 of ultrasonic horn tip 208. In this embodiment, tube 206 is inserted in an in-line path parallel to longitudinal central axis 230 of ultrasonic horn tip 208 into tooling 200.

Figure 5:
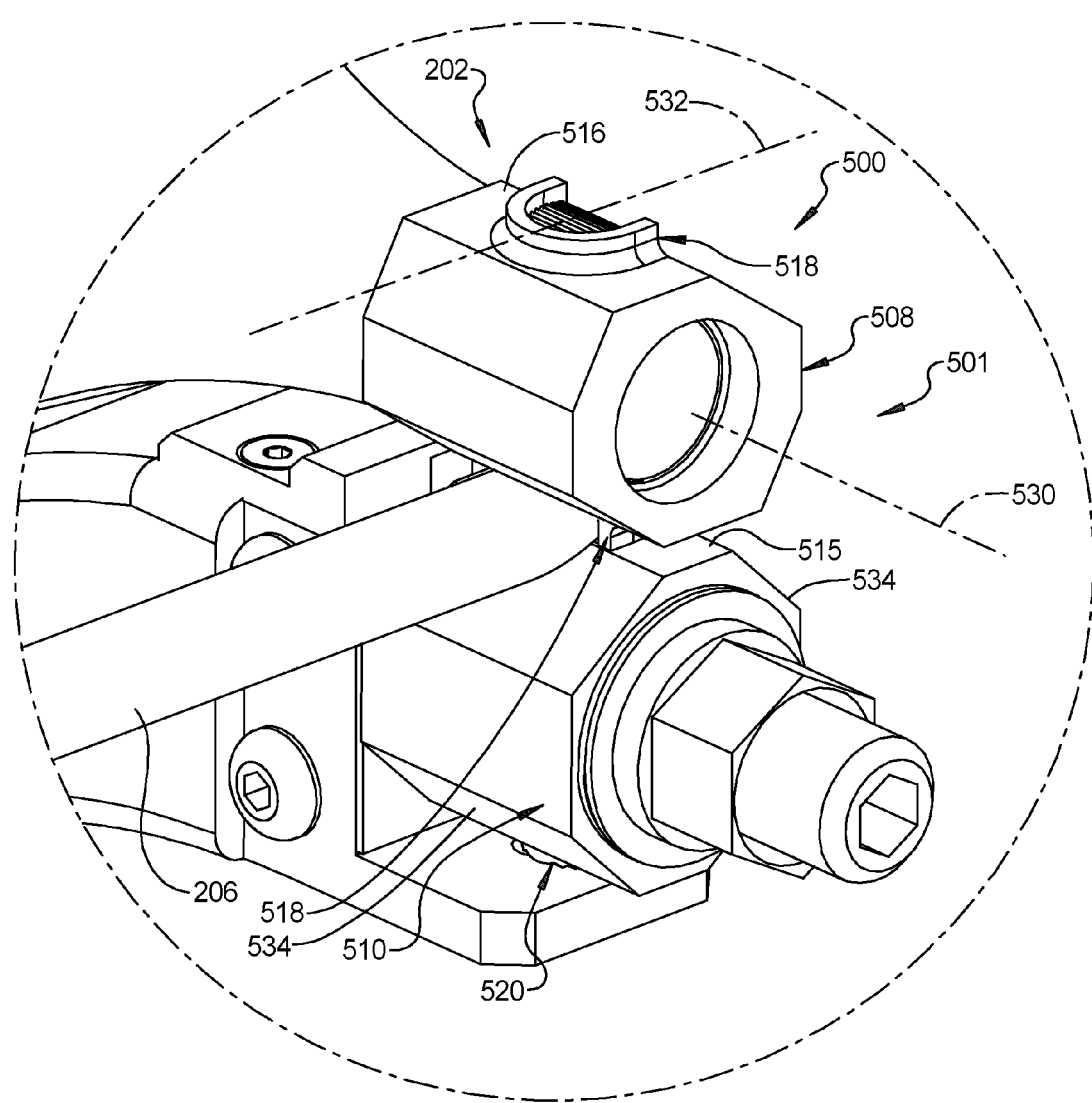
FIG. 5 is a perspective view of a portion of an ultrasonic tube sealer showing another embodiment of an ultrasonic horn tip and anvil tip in accordance with an aspect of the present disclosure.
Figure 6:
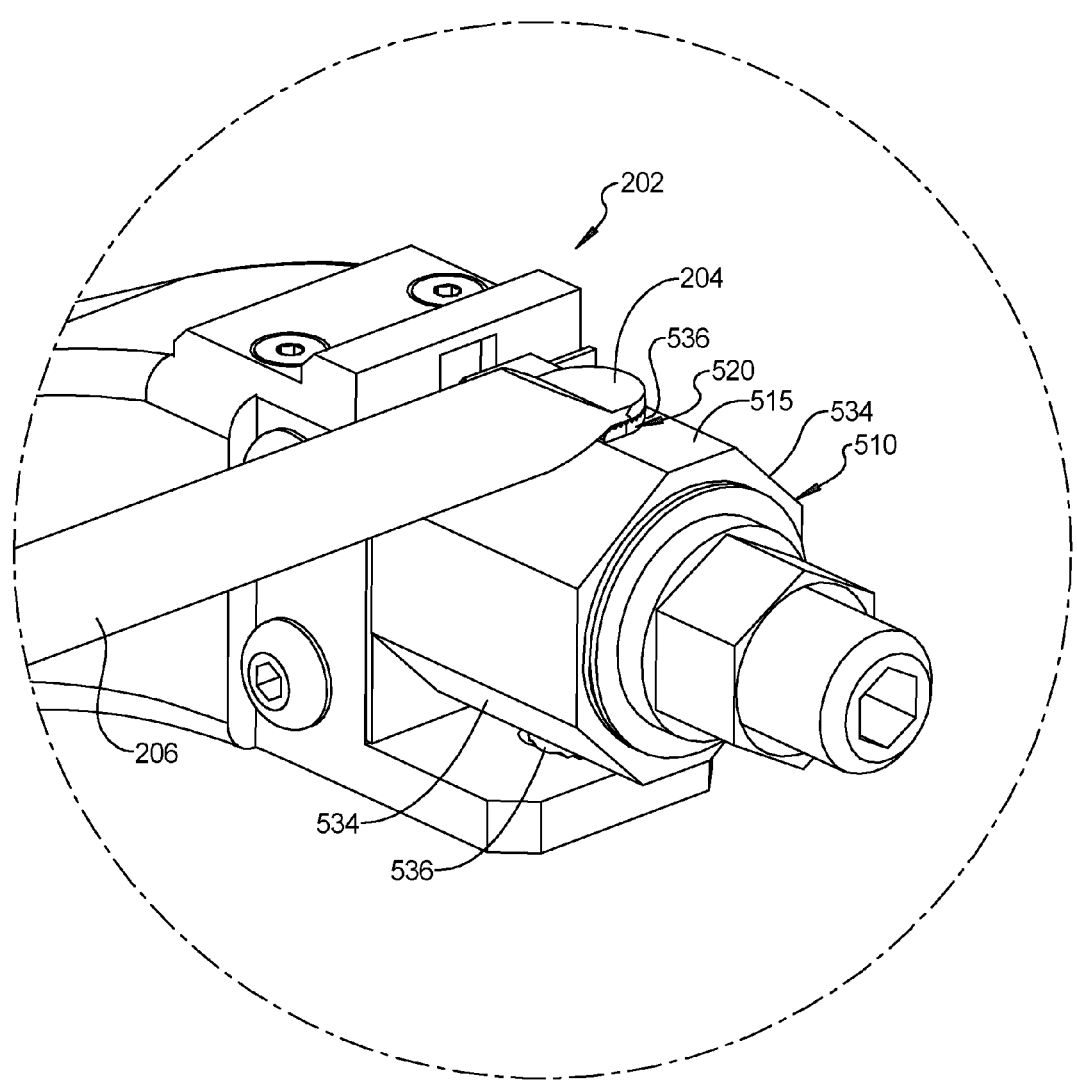
FIG. 6 is a perspective view showing in more detail the anvil tip of FIG. 5 with a tube thereon.
Figure 7:
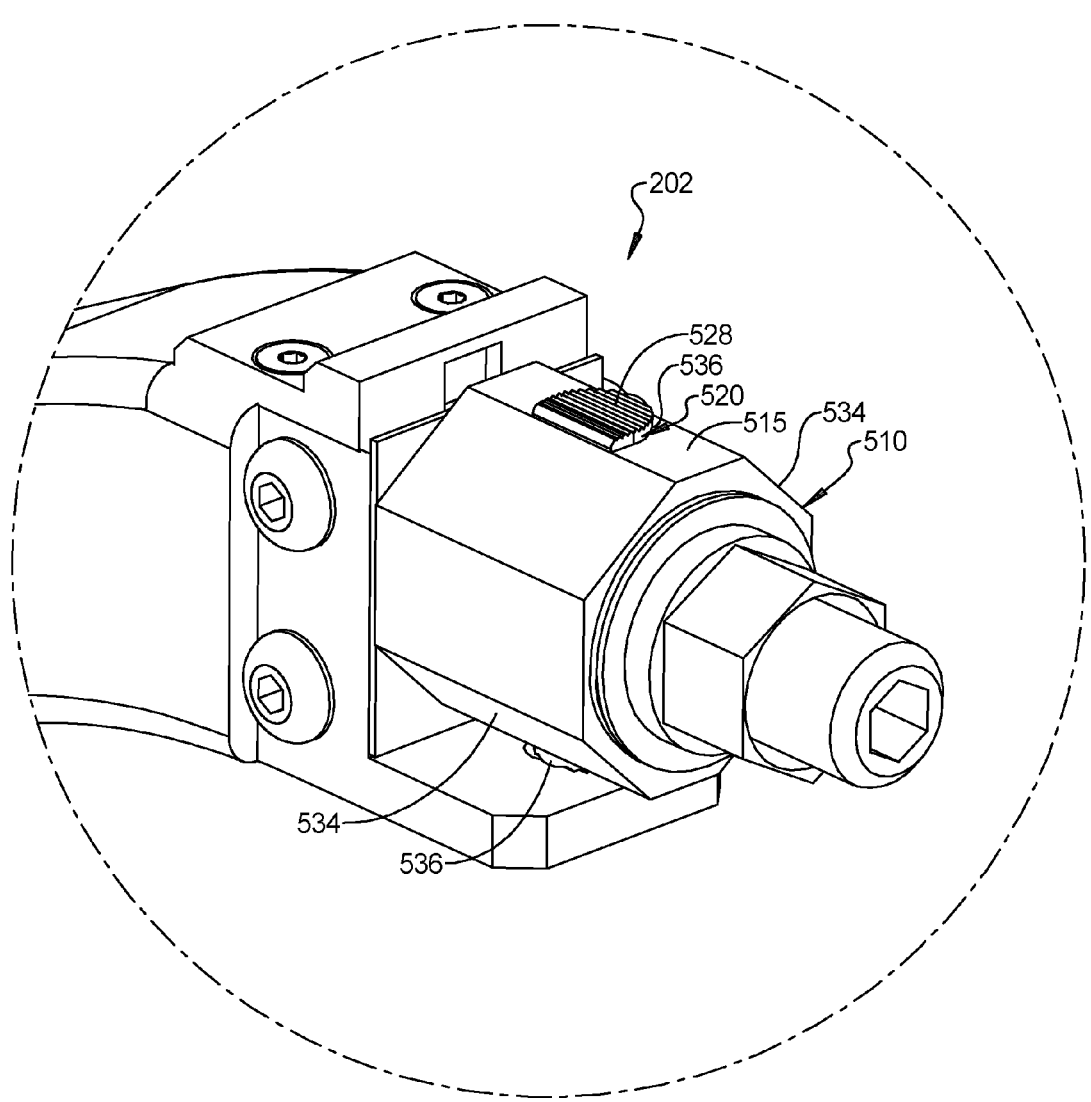
FIG. 7 is a perspective view showing in more detail the anvil tip of FIG. 5 without a tube thereon.

In another example embodiment shown in FIGS. 5-7, tooling 500 includes ultrasonic horn tip 508 and an anvil 510. In the example embodiment, ultrasonic horn tip 508 is a replaceable component and mounted on ultrasonic horn 212. In an aspect, ultrasonic horn tip 508 is an integral part of ultrasonic horn 212.

In the example embodiment shown in FIG. 5-7, tooling 500 has a lateral (or ninety degree) orientation in that each forming tool 518 of ultrasonic horn tip 508 opens along an axis 532 that is transverse to a longitudinal central axis 530 of ultrasonic horn tip 508 and forming tools 520 of anvil 510 have a similar orientation with a respective sloped wall 534 adjacent an outer end 536 of each forming tool 520. Other than their orientation, forming tools 518 of ultrasonic horn tip 508 and 520 of anvil 510 are the same as forming tools 218, 220 respectively that are described above. In this regard, forming tools 518 on sides 516 of ultrasonic horn tip 508 are rotated ninety degrees compared with forming tool 218 on sides 216 of ultrasonic horn tip 208. Forming tools 520 on sides 515 of anvil 510 (which each include a semicircular raised pad 528 as best shown in FIG. 7) are also rotated ninety degrees compared with forming tools 220 of anvil 210. Tooling 500 is also configured to form end portion 204 of tube 206 to have a rounded configuration when end portion 204 is sealed. In this latter embodiment, tube 206 is fed in a lateral path transverse to longitudinal central axis 530 of ultrasonic horn tip 508 into tooling 500. Ultrasonic tube sealer 202 otherwise operates as described above. In an aspect, tooling 500 includes a tooling kit 501 that includes ultrasonic horn tip 508 and anvil 510.

While each side 516 of ultrasonic horn tip 508 having a forming tool 518 is shown having one forming tool 518, it should be understood that each side 516 of ultrasonic horn tip 508 having a forming tool 518 thereon can have two opposed forming tools 518 thereon. Each side 515 of anvil 510 would then have two corresponding forming tools 520 thereon. Two tubes 206 can thus be sealed at the same time using this variation of tooling 500, with the second tube 206 being inserted into tooling 500 from a side opposite a side of tooling 500 into which the tube 206 shown in FIGS. 5-7 is inserted. An example of this embodiment is shown and described with reference to FIGS. 8-10.

Figure 8:
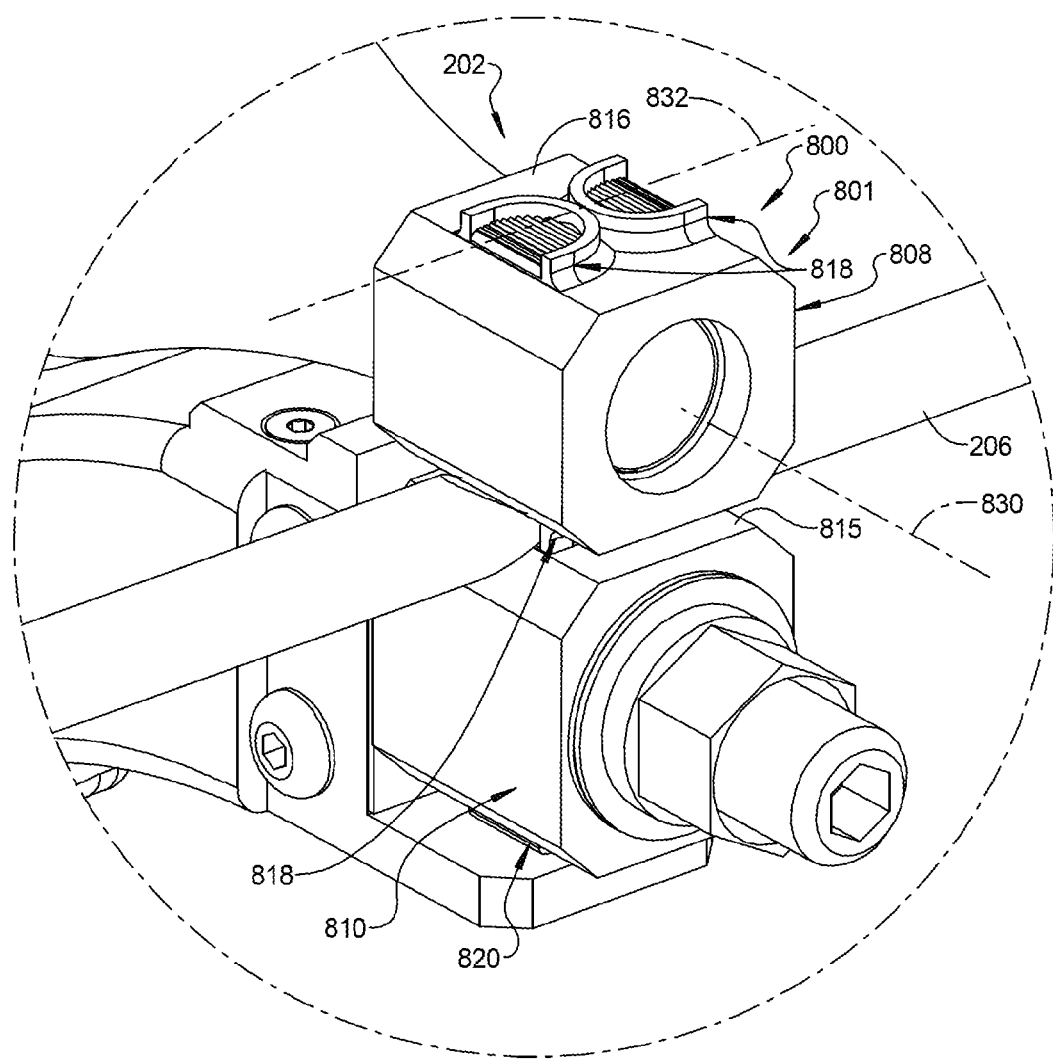
FIG. 8 is a perspective view of a portion of an ultrasonic tube sealer showing another embodiment of an ultrasonic horn tip and anvil tip in accordance with an aspect of the present disclosure.
Figure 9:
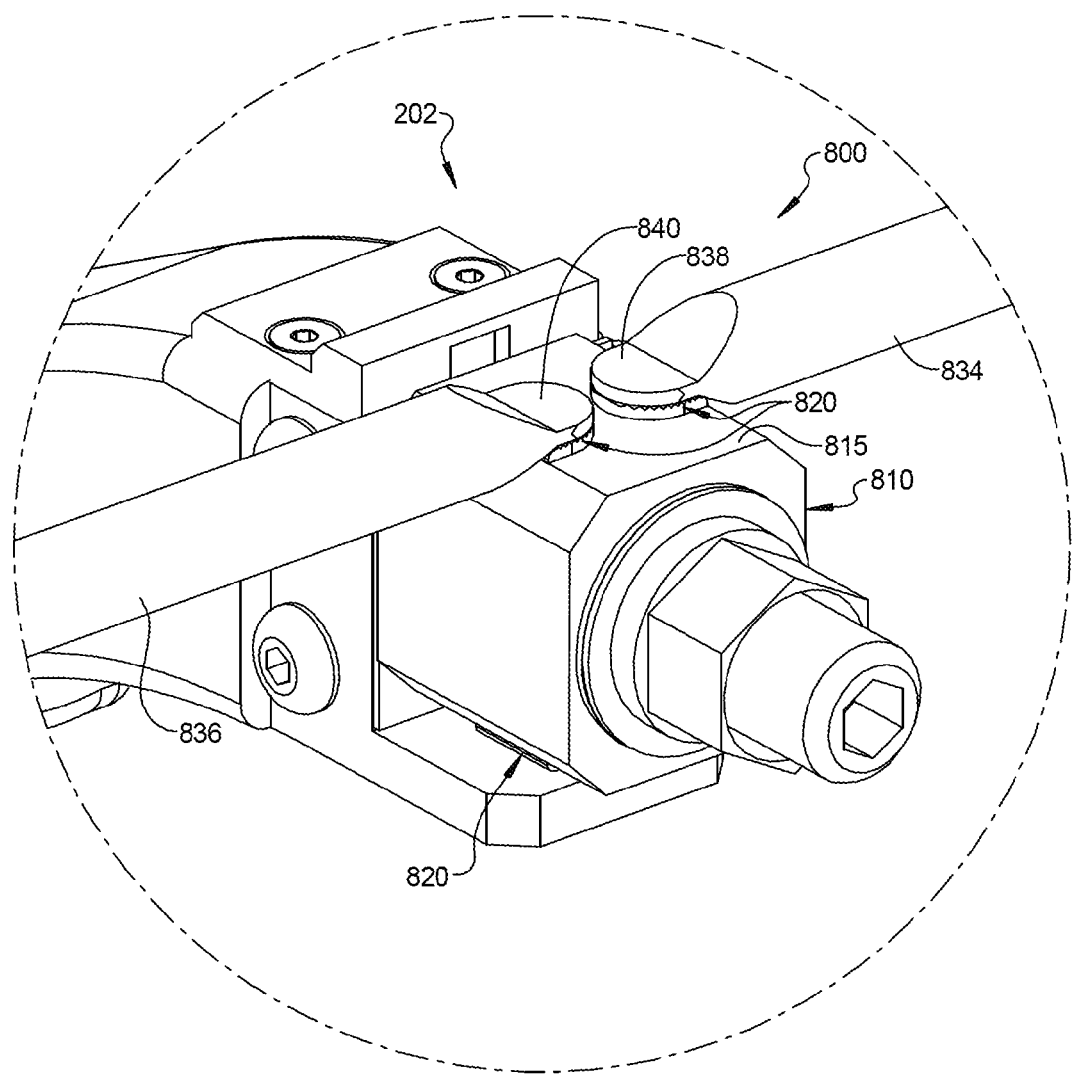
FIG. 9 is a perspective view showing in more detail the anvil tip of FIG. 8 with a tube thereon that has been cut in half.
Figure 10:
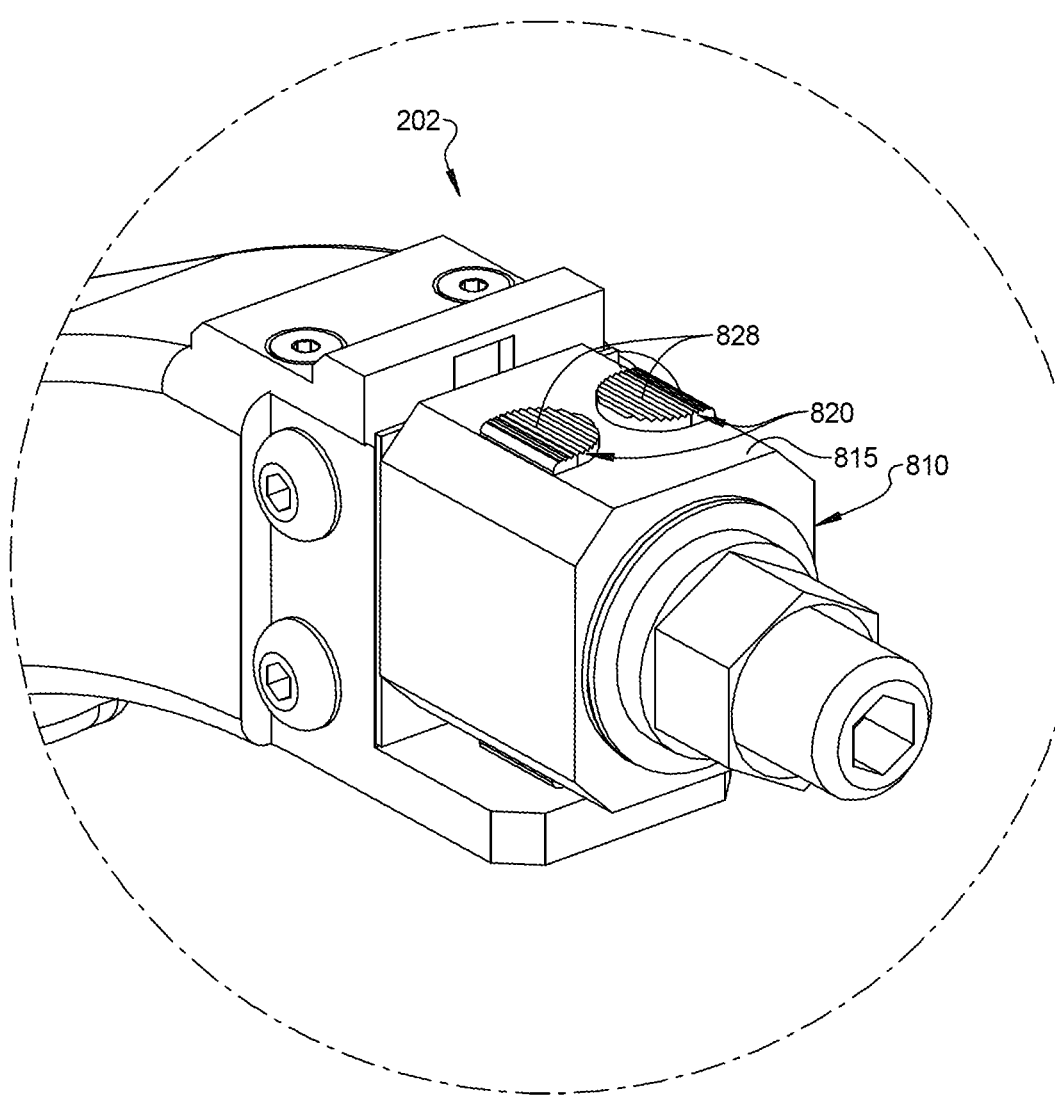
FIG. 10 is a perspective view showing in more detail the anvil tip of FIG. 8 without a tube thereon.

In another example embodiment shown in FIGS. 8-10, tooling 800 includes ultrasonic horn tip 808 and an anvil 810. In the example embodiment, ultrasonic horn tip 808 is a replaceable component and mounted on ultrasonic horn 212. In an aspect, ultrasonic horn tip 808 is an integral part of ultrasonic horn 212.

In the example embodiment shown in FIGS. 8-10, tooling 800 has a lateral (or ninety degree) orientation in that each forming tool 818 of ultrasonic horn tip 808 opens along an axis 832 that is transverse to a longitudinal central axis 830 of ultrasonic horn tip 808 and forming tools 820 of anvil 810 have a similar orientation. Other than their orientation, forming tools 818 of ultrasonic horn tip 808 and 820 of anvil 810 are the same as forming tools 218, 220 respectively that are described above. Tooling 800 is illustratively a tooling kit 801 that includes ultrasonic horn tip 808 and an anvil 810. In this regard, forming tools 818 on sides 816 of ultrasonic horn tip 808 are rotated ninety degrees compared with forming tool 218 on sides 216 of ultrasonic horn tip 208. Each side 816 has opposed forming tools 818 thereon oriented to open outwardly along axis 832 so forming tools 818 open 180 degrees with respect to each other. Forming tools 820 on sides 815 of anvil 810 (which each include a semicircular raised pad 828 as best shown in FIG. 10) are also rotated ninety degrees compared with forming tools 220 of anvil 210. Each side 815 of anvil 810 having forming tools 820 has two forming tools 820 corresponding to forming tools 818 of ultrasonic horn tip 808 including a corresponding orientation. Each forming tool 820 of the anvil thus has an orientation corresponding to an orientation of a corresponding forming tool 818 of ultrasonic horn tip 808.

Tooling 800 is configured to both cut tube 206 and also seal the resulting ends 838, 840 of the cut tubes 834, 836 on opposite sides of the cut. That is, tube 206 is inserted into tooling 800 so that it spans across tooling 800. In this example embodiment, tooling 800 is configured to cut tube 206 in half, form the ends 838, 840 of the resulting two tubes 834, 836 that are adjacent the cut to have a rounded configuration and seal these ends 838, 840. In this example embodiment, tube 206 is oriented so that it is transverse to longitudinal central axis 830 and fed into tooling 800 so that it spans laterally across tooling 800 along axis 832. Ultrasonic sealer then otherwise operates as described above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An ultrasonic horn tip for an ultrasonic horn of an ultrasonic tube sealer, comprising:
   the ultrasonic horn tip having at least one forming tool having a configuration that forms an end of a tube when it is sealed by the ultrasonic tube sealer to be rounded wherein each forming tool has a semicircular pad with an arcuate wall extending orthogonally from and around an outer periphery of the semicircular pad.

2. The ultrasonic horn tip of claim 1 having a longitudinal orientation wherein each forming tool opens along an axis that is parallel to a longitudinal central axis of the ultrasonic horn tip.

3. The ultrasonic horn tip of claim 2 wherein the horn tip includes a plurality of forming tools, the ultrasonic horn tip having a plurality of sides with at least two of the sides of the ultrasonic horn tip each having at least one of the plurality forming tools of the ultrasonic horn tip.

4. The ultrasonic horn tip of claim 3 wherein each side of the ultrasonic horn tip having at least one of the plurality of forming tools of the ultrasonic horn tip has opposed forming tools.

5. An ultrasonic horn tip for an ultrasonic horn of an ultrasonic tube sealer, comprising:
   the ultrasonic horn tip having a lateral orientation wherein a side of the ultrasonic horn tip has opposed forming tools wherein each of the opposed forming tools opens outwardly along an axis that is transverse to a longitudinal central axis of the ultrasonic horn tip wherein the opposed forming tools can each receive an end of a tube at the same time as the other one of the opposed forming tool receives an end of another tube and each forming tool has a configuration that cooperates with a respective forming tool of an anvil to cut, seal and form the end of the tube received in it when the end of the tube is sealed by the ultrasonic tube sealer and forms the end of the tube to be rounded and the opposed forming tools in cooperation with the forming tools of the anvil simultaneously cutting, sealing and forming the ends of both tubes as the ends of both tubes are being sealed by the ultrasonic tube sealer.

6. The ultrasonic horn tip of claim 5 wherein each forming tool has a semicircular pad with an arcuate wall extending orthogonally from and around an outer periphery of that semicircular pad.

7. The ultrasonic horn tip of claim 5 wherein each forming tool has a raised semicircular pad.

8. The ultrasonic horn tip of claim 5 wherein the ultrasonic horn tip is removably mountable on the ultrasonic horn.

9. The ultrasonic horn tip of claim 5 wherein the ultrasonic horn tip is an integral part of the ultrasonic horn.

10. An anvil for an ultrasonic tube sealer, comprising:
the anvil having at least one forming tool having a configuration that forms an end of a tube when it is sealed by the ultrasonic tube sealer to be rounded and a sloped wall adjacent an outer end of the forming tool wherein each forming tool has a semicircular pad with an arcuate wall extending orthogonally from and around an outer periphery of the semicircular pad.

11. The anvil of claim 10 having a longitudinal orientation with each forming tool opening along an axis that is parallel to a longitudinal central axis of the ultrasonic horn tip.

12. The anvil of claim 11 wherein the anvil includes a plurality of forming tools, the anvil having opposed end portions with each end portion having a plurality of sides with at least two of the sides of each end section of the anvil each having one of the forming tools of the anvil.

13. An anvil for an ultrasonic tube sealer, comprising:
the anvil having a lateral orientation wherein a side of the anvil has opposed forming tools wherein each of the opposed forming tools opens outwardly along an axis that is transverse to a longitudinal central axis of the anvil wherein the opposed forming tools can each receive an end of a tube at the same time as the other one of the opposed forming tool receives an end of another tube and each forming tool has a configuration has a configuration that cooperates with a respective forming tool of a horn tip to cut, seal and form the end of the tube received in it when the end of the tube is sealed by the ultrasonic tube sealer and forms the end of the tube to be rounded and the opposed forming tools in cooperation with the forming tools of the horn tip to simultaneously cut, seal and form the ends of both tubes when the ends of both tubes are being sealed by the ultrasonic tube sealer.

14. The anvil of claim 13 wherein each forming tool has a semicircular pad with an arcuate wall extending orthogonally from and around an outer periphery of that semicircular pad.

15. The anvil of claim 13 wherein each forming tool has a raised semicircular pad.

* * * * *